(12) United States Patent
Meynier

(10) Patent No.: US 6,338,394 B1
(45) Date of Patent: Jan. 15, 2002

(54) COMPACT VIBRATOR AND SEISMIC MONITORING OR PROSPECTING METHOD USING SUCH A VIBRATOR

(75) Inventor: Patrick Meynier, Chatou (FR)

(73) Assignees: Compagnie Generale de Geophysique, Massy cedex; Gaz de France, Paris cedex; Institut Francais de Petrole, Rueil-Malmaison, all of (FR)

(*) Notice: Subject to any disclaimer, the term of this patent is extended or adjusted under 35 U.S.C. 154(b) by 0 days.

(21) Appl. No.: 09/534,524

(22) Filed: Mar. 24, 2000

(30) Foreign Application Priority Data

Mar. 30, 1999 (FR) .............................. 99 04001

(51) Int. Cl.$^7$ .............................. G01V 1/02; H01L 41/08
(52) U.S. Cl. ..................... 181/113; 181/114; 181/121; 310/328
(58) Field of Search ............................... 181/101–108, 181/111–114, 121, 122; 367/25, 912; 310/316–318, 322, 323, 328, 331, 334, 335

(56) References Cited

U.S. PATENT DOCUMENTS

| | | | |
|---|---|---|---|
| 4,975,615 A | * 12/1990 | Katahara | .................. 310/328 |
| 5,005,665 A | 4/1991 | Cheung | |
| 5,360,951 A | 11/1994 | Turpening | |
| 5,724,311 A | 3/1998 | Laurent et al. | |
| 6,119,804 A | * 9/2000 | Owen | .................. 181/113 |

* cited by examiner

Primary Examiner—Khanh Dang
(74) Attorney, Agent, or Firm—Antonelli, Terry, Stout & Kraus, LLP

(57) ABSTRACT

Compact vibrator for emitting elastic waves in a material medium such as the subsoil. The vibrator comprises a baseplate (3) intended to be coupled in operation with a surface of this medium, an inertia mass (5) and at least a pair of electromechanical transducers (1, 2) comprising each one or more pillars (A, B) made for example of a piezoelectric or magnetostrictive material. Pillars (A) of first transducer (1) are interposed between baseplate (3) and a relay plate (4). Pillars (B) of the second transducer are interposed between relay plate (4) and inertia mass (5), on the same side of relay plate (4) as pillars (A) preferably, so that inertia mass (5) is positioned in the vicinity of baseplate (3), which contributes to the compactness and to the stability of the vibrator that can therefore be used on slightly sloping surfaces. An excitation generator (6) comprising phase shifting means (7) respectively applies to transducers (A, B) phase-shifted signals that are amplitude-modulable, so that their vibrations combine. The vibrator can be applied: notably for equipping an underground zone under development with periodic seismic monitoring means or for carrying out seismic prospecting operations.

41 Claims, 2 Drawing Sheets

COMPACT VIBRATOR AND SEISMIC MONITORING OR PROSPECTING METHOD USING SUCH A VIBRATOR

BACKGROUND OF THE INVENTION

1. Field of the Invention

The present invention relates to a compact electromechanical vibrator and to an implementation method.

2. Description of the Prior Art

Electromechanical vibrators find applications notably within the scope of seismic exploration operations where seismic images of an underground formation to be explored are formed from elastic waves picked up by suitable seismic receivers, these waves being reflected by the subsoil discontinuities in response to waves emitted by a source, either an impulsive source: charge of explosives in a hole, air guns towed by a boat at sea, etc., or vibrators emitting variable-duration signals, generally with a variable frequency. The frequency variation can be continuous within a certain frequency range (sweep) as described in U.S. Pat. No. 2,688,124 or discontinuous with binary coding as in French patent 2,589,587.

The vibrators can be electromagnetic, electro-hydraulic or piezoelectric type vibrators. A piezoelectric type vibrator generally comprises a baseplate coupled with the ground, a relatively heavy inertia mass coupled with the baseplate by means of one or more piezoelectric transducers. Each transducer comprises for example a bar consisting of a single piece or of a pile of piezoelectric ceramic disks coupled in series, and it is connected to a frequency or phase modulated vibratory signal generator. A piezoelectric vibrator is for example described in U.S. Pat. No. 5,005,665.

In order to obtain sufficient force and vibrational amplitude, it is necessary to use ceramic pillars of relatively great length, of the order of 1 m in practice. As a result of this piling, the heavy inertia mass is placed relatively high so that the vibrator is unstable and ill-suited for working on an even slightly sloping ground without previous anchoring. Furthermore, ceramic pillars of great length prove to be more fragile.

SUMMARY OF THE INVENTION

The electromechanical vibrator according to the invention allows application of a vibrational force to a material medium while avoiding the aforementioned drawbacks. It comprises a baseplate intended to be coupled in operation with a surface of this medium, an inertia mass tightly connected to the baseplate by a vibrator electrically connected to an excitation generator.

The vibrator comprises at least two electromechanical transducers including each at least one elongate motive element (of any type, but preferably comprising one pillar per pile of disks made of a piezoelectric or magnetostrictive material), each motive element of the first transducer tightly connecting the baseplate to a relay plate and each motive element of the second transducer being tightly connected, at one end, to the relay plate and, at the opposite end, to the inertia mass placed between the baseplate and the relay plate, the excitation generator comprising a phase shifter for applying phase-shifted signals to the two transducers respectively.

According to an embodiment, the vibrator comprises a pair of transducers placed on the same side of a relay plate and tightly coupled thereto, each motive element of the second transducer tightly connecting the relay plate to the inertia mass.

According to another embodiment, the vibrator comprises at least two pairs of transducers, the transducers of each pair being placed on the same side of a relay plate and tightly coupled thereto, each motive element of the second transducer being tightly connected, at one end, to the relay plate and connected, at the opposite end, to the inertia mass by means of the second pair of transducers and of relay plates.

According, to a preferred embodiment, the electromechanical transducers each comprise one or more pillars made of a piezoelectric or magnetostrictive material.

With such a layout of at least one pair of electromechanical transducers with motive elements of limited length, coupled and combined by means of one or more relay plates, the inertia mass can be positioned next to the baseplate, which allows obtaining of a very robust and very stable vibrator of limited overall height.

Each transducer preferably comprises several elongate motive elements arranged parallel to each other and connected in parallel to the phase shifter.

According to a preferred embodiment, the size of the vibrator is decreased by making one or more recesses through the inertia mass through which run the motive elements of each transducer.

According to another preferred embodiment, at least one housing is provided in the inertia mass so that part of the length of the motive elements of the second transducer is housed in the thickness thereof.

The excitation generator preferably comprises a connection allowing separate excitation of the two transducers of each pair with amplitude and phase modulable excitation signals.

In applications where the stability criterion is not particularly sought, it is possible to use a vibrator comprising at least three electromechanical transducers interconnecting the baseplate and the inertia mass, these transducers being connected to each other by means of at least two relay plates, the excitation generator being connected to the various transducers by a phase shifter suited to apply phase-shifted excitation signals thereto respectively, so as to combine the vibrational signals emitted by the various transducers.

In certain applications where the vibrator is to be placed in a cavity extended by a reservoir exploitation well, the baseplate, the inertia mass and each relay plate can be provided with a central recess for passage of tubing.

The invention also relates to a method of seismic monitoring of an underground zone such as an underground fluid storage reservoir for example, comprising:

coupling an elastic wave receiver with the zone (in a well for example), installing, for the zone monitoring period, at least one vibrator comprising a baseplate intended to be coupled in operation with a surface of the zone (the bottom of a cavity bored in the ground for example or the lateral walls thereof), an inertia mass tightly connected to the baseplate by at least two electromechanical transducers arranged on the same side of a relay plate, and tightly connected thereto, each transducer comprising at least one elongate motive element electrically connected to an excitation generator by the phase shifter suited to apply phase-shifted signals thereto respectively so as to combine the vibrational signals emitted by the various transducers, installing a network of electric cables connected to the transducers of each vibrator, and connecting the cables of this network to a central station comprising at least one electric excitation generator allowing excitation of each vibrator by amplitude and phase modulable signals, a selective connector of each vibrator by means of the network of electric cables, and a recorder for recording the signals coming from the underground zone in response to the elastic waves selectively transmitted in the ground by each vibrator.

The vibrators are preferably placed in cavities provided in the ground and the elastic wave receivers coupled with the formation in one or more wells drilled in the formation, whose locations are distinct from the cavities or not. They are suitably coupled with the cavity so as to generate longitudinal or transverse waves in the formation.

For seismic monitoring of an underground zone, a plurality of assemblies made up of vibrators and receivers can be provided and monitoring cycles can be carried out with excitation of the various vibrators (successively or simultaneously according to particular modes) and recording of the waves reflected by the formations in response to the emitted waves received by various receivers.

The vibrator according to the invention can be used within the scope of onshore seismic prospecting operations as well as seismic monitoring operations carried out onshore or at the bottom of a water mass.

As a result of the robustness and compactness thereof, the vibrator according to the invention can be readily installed permanently in a cavity provided in the ground and intermittently excited by means of the network, within the scope of periodic underground zone monitoring operations, or it can be used for seismic prospecting operations.

BRIEF DESCRIPTION OF THE DRAWINGS

Other features and advantages of the vibrator according to the invention will be clear from reading the description hereafter of non limitative embodiment examples where the transducers are piezoelectric type transducers, with reference to the accompanying drawings wherein.

DETAILED DESCRIPTION OF THE PREFERRED EMBODIMENTS OF THE INVENTION

The vibrator V according to the invention is made by mechanical coupling of transducers each comprising pillars each, as it is known in the art, including piles of sensitive elements electrically connected in series, of, for example, a piezoelectric type.

Figure 1:
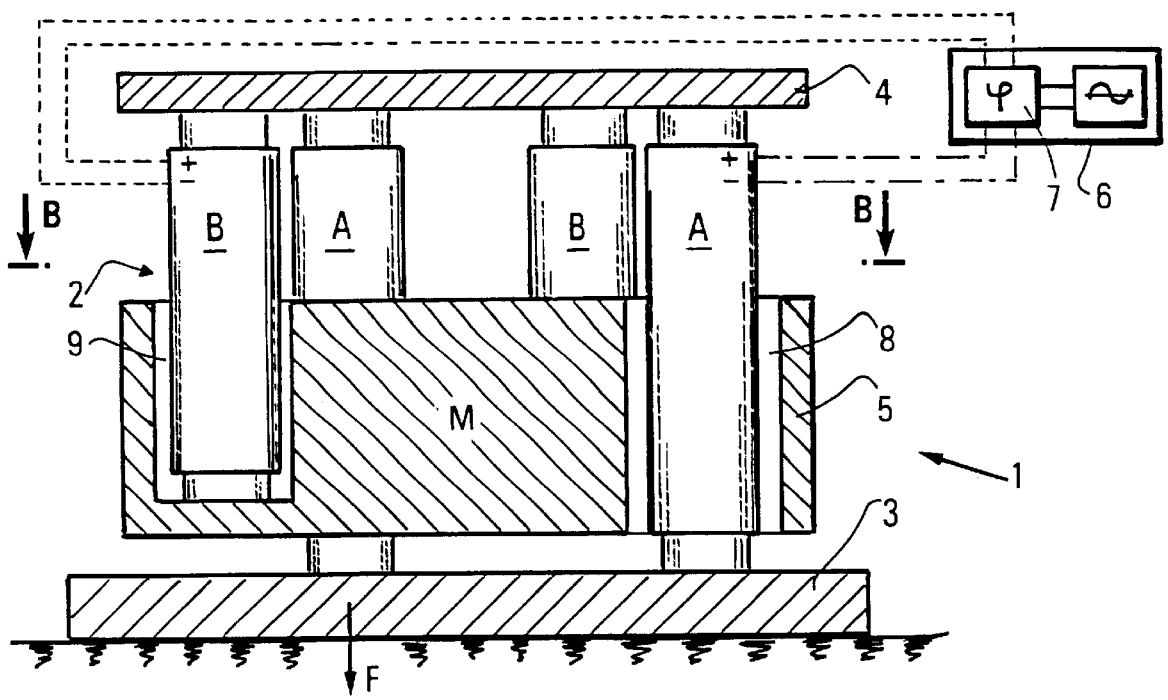
FIG. 1 diagrammatically shows a cross-sectional view of a first embodiment of the vibrator according to the invention, whose motive elements are pillars of sensitive piezoelectric elements.
Figure 2:
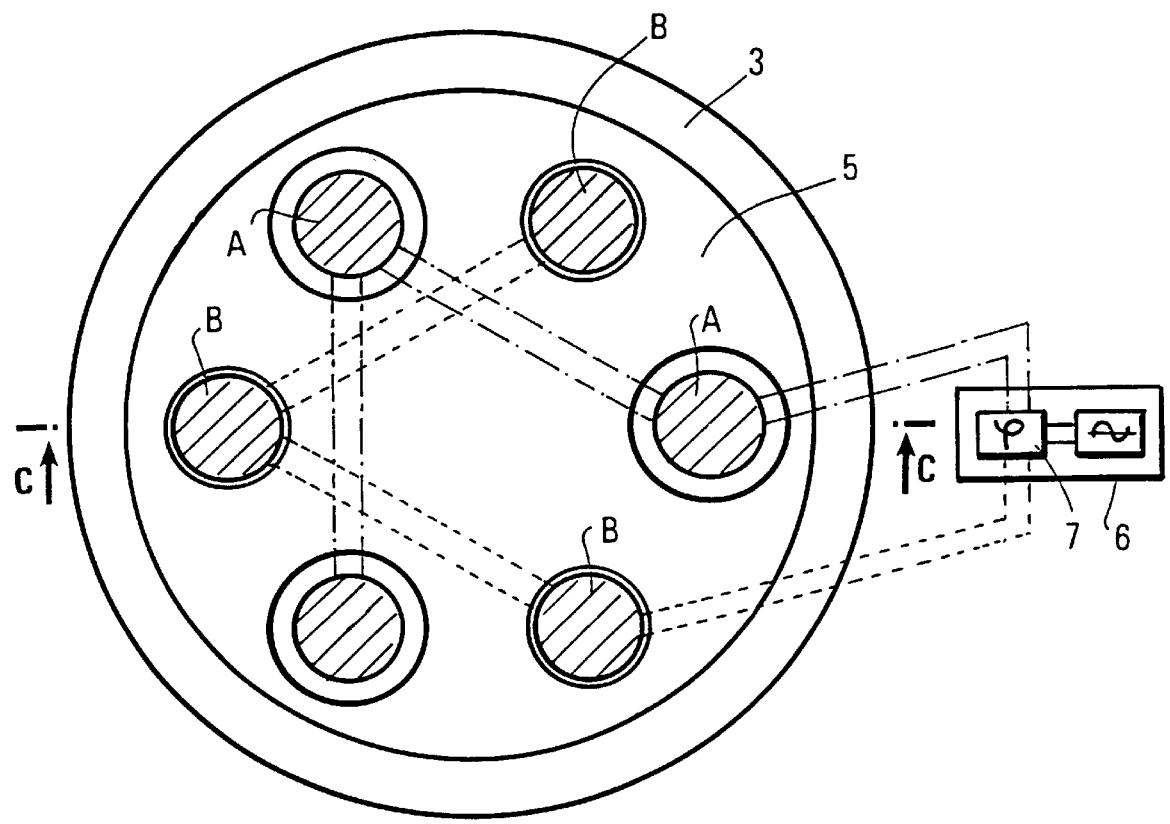
FIG. 2 is a cross-sectional top view along CC of the same vibrator, showing the respective layouts of two piezoelectric transducer pillars, FIG. 3 diagrammatically shows a third embodiment of the vibrator with two coaxial transducers, FIG. 4 diagrammatically shows a fourth embodiment of the vibrator with two coaxial transducers.

The embodiment of FIGS. 1, 2 comprises two transducers 1 and 2 connected in opposition, each including pillars of piled disks. A first end of each pillar A of a first piezoelectric transducer 1 is tightly fastened to a baseplate 3 suited to be pressed against the ground surface or the bottom of a hole. At the opposite end thereof, pillars A are tightly fastened to a relay plate 4. Each pillar B of a second piezoelectric transducer 2 is tightly fastened, at a first end, to relay plate 4 and, at the opposite end thereof, to a sufficiently heavy inertia mass 5. The layout is such that inertia mass 5 is suspended from relay plate 4 by pillars B of a second piezoelectric transducer 2, relay plate 4 itself being supported by pillars A resting on baseplate 3.

The pillars of each piezoelectric transducer 1 or 2 are electrically connected in parallel to a vibratory signal generator 6 comprising a phase shifter 7. Piezoelectric transducers 1 and 2 are connected to the phase shifter 7 so that the respective vibrations thereof combine. The amplitude of the displacements applied from baseplate 3 in relation to inertia mass 5 reaches a maximum level when both transducers are fed in phase opposition.

This combination of tranducers 1 and 2 with pillars of average length allows the obtaining of the same force and the same elongation as those obtained with a single transducer using long and more fragile ceramic pillars. The assembly obtained, wherein the inertia mass is positioned in the vicinity of the baseplate, provides a compact and more stable vibrator.

The combination of two transducers affords another advantage if a connection allowing supply of the transducer separately from generator 6 is used. By varying the amplitude of the signals delivered to transducers 1 and 2 respectively, as well as the phase shift applied thereto by phase shifter 7, the response curve of the vibrator can be corrected and in particular its frequency spectrum can be equalized.

Openings 8 are preferably provided through inertia mass 5 in order to allow free passage of pillars A of first piezoelectric transducer 1 connecting baseplate 3 to relay plate 4. The floor surface of the vibrator and the dimensions of the relay plate are thus reduced, the latter being therefore more rigid. As shown in FIG. 2, the pillars of transducers 1 and 2 are preferably distributed at regular angular intervals in relation to one another.

It is also possible to gain in height by providing cavities 9 in inertia mass 5 so that part of the length of pillars B of second piezoelectric transducer 2 is housed in the thickness thereof.

The signal delivered by generator 6 can be frequency and/or amplitude modulated so as to implement known seismic exploration techniques using variable-frequency vibrators.

Figure 3:
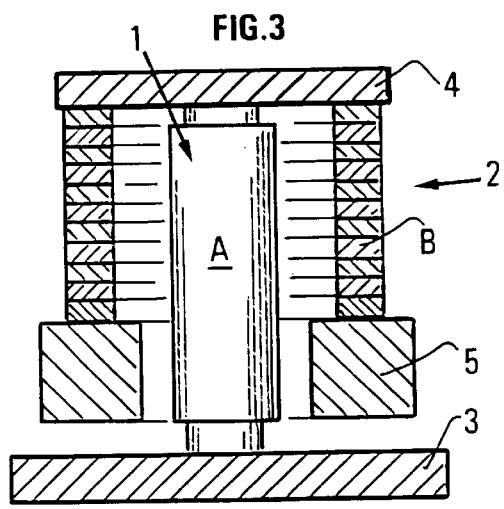
Figure 4:
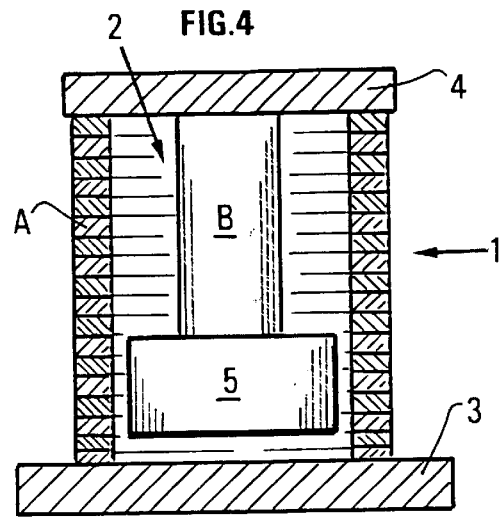

Transducers 1 and 2 can also be arranged concentrically as shown in FIGS. 3 and 4.

According to the embodiment of FIG. 3, baseplate 3 is coupled with relay plate 4 by a single central pillar A of a pile of sensitive disks. Coupling between relay plate 4 and inertia mass 5 is provided by a pile B of annular disks arranged around central pillar A. Inertia mass 5 comprises a central recess 11 allowing free passage of central pillar A.

Figure 5:
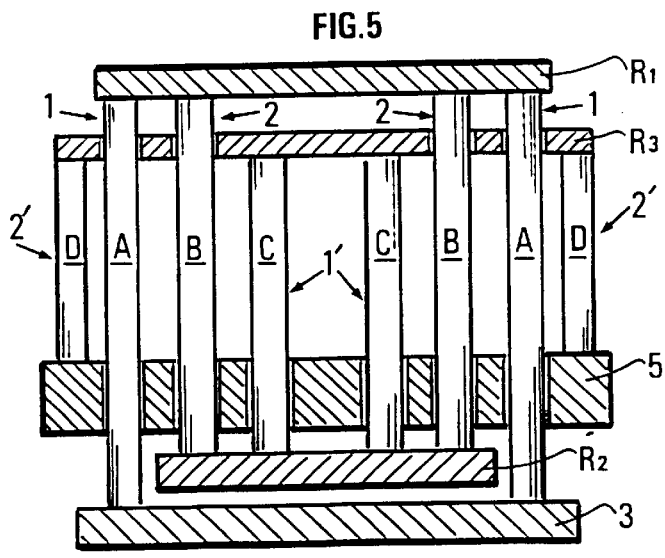
FIG. 5 is a flowsheet illustrating an embodiment where the vibrator comprises two pairs of imbricated piezoelectric transducers, FIG. 6 diagrammatically shows a first example of layout for periodic seismic monitoring of an underground zone.

According to the embodiment of FIG. 4, a pile A of annular disks tightly connects baseplate 3 and relay plate 4, whereas connection between the relay plate and inertia mass 5 is provided by a pillar B running through pile A, According to the embodiment of FIG. 5, a second pair of transducers is associated with the first pair of transducers allowing, through double return, to position mass 5 in the vicinity of baseplate 3. With such a layout, a first set of pillars A connects baseplate 3 to a first relay plate R1, a second set of pillars B connects, in the opposite direction, first relay plate R1 to a second relay plate R2, itself connected by a set of pillars C to a third relay plate R3, in the vicinity of first relay plate R1. Finally, pillars D connect third relay plate R3 to inertia mass 5, in the vicinity of the second relay plate and of baseplate 3.

With such a layout of four transducers separately excited in amplitude and suitably phase-shifted in relation to one another, the possibilities of adjusting the global response curve of the vibrator are increased.

The described arrangement of the location of the transducer pillars respectively between relay plate (4, R1) on the one hand and baseplate 3 and inertia mass 5 is not limitative. Any other positioning of the pillars in relation to one another, allowing the inertia mass to be positioned in the vicinity of the surface of coupling of the vibrator with the ground, can be selected.

Figure 8:
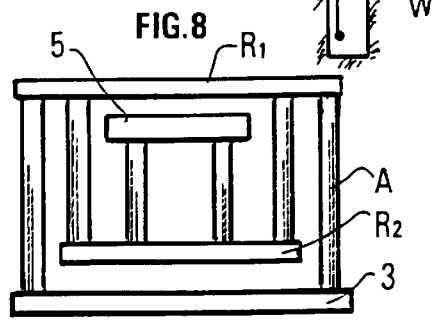

In applications where the stability of the vibrator, obtained as described by positioning inertia mass 5 in the vicinity of baseplate 3, is not particularly sought, it is possible to use, without departing from the scope of the invention, an uneven number of transducers as diagrammatically illustrated in FIG. 8. Pillars A of a first transducer connect baseplate 3 to a first relay plate R1. On the same side of this first relay plate. pillars B of a second transducer connect the second transducer to a second relay plate R2. Inertia mass 5 is connected to second relay plate R2 by pillars C of a third transducer, situated on the same side thereof as pillars B.

The vibrator as described above can be used as a permanent source within the scope of underground reservoir seismic monitoring techniques described, for example, in U.S. Pat. Nos. 5,243,562 and 5,724,311 or in French patent application FR-98/02,170 where seisnuc receivers and one or more elastic wave sources coupled with a energy supply are permanently installed on a development site in order to perform periodic seismic surveys.

Vibrators G such as those described above can be (FIG.6) readily coupled with the surface or installed in the vicinity of the surface. Vibrators G are preferably installed in rather deep underground cavities S (some ten meters for example).

Baseplate 3 of the vibrator can be brought into contact with the bottom and/or with the walls so as to generate in the surrounding formations, as the case may be, longitudinal waves or transverse waves or shear waves.

Each vibrator is connected by electric cables 12, possibly buried, to a vibratory signal generator in a central station 13 also suited to collect and record the signals picked up by reception means R, lowered into one or more wells W, in response to the vibratory signals emitted.

Wells W can be drilled especially to install receivers R therein, at a depth of some hundred meters. One or more of the wells can also be wells intended for development of the underground zone, the receivers being installed behind a casing tube or associated with a well development tubing.

Each cavity can be formed by widening a well W for receivers in the upper part thereof, or drilled several meters from the uphole. For applications where the cavity is crossed through by a tubing intended for development of an underground zone, a vibrator suited to be placed around it is used. Baseplate 3, inertia mass 5 and each relay plate 4 of such a vibrator are therefore provided with a central opening allowing passage of the tubing.

Figure 7:
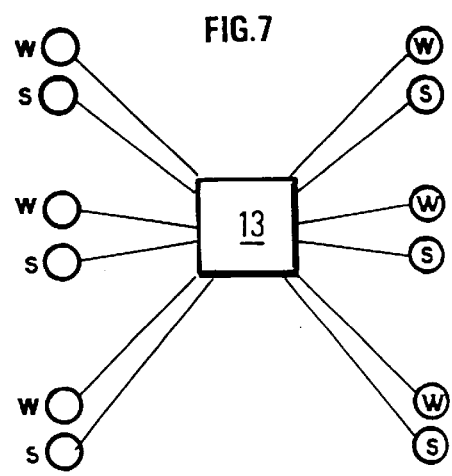
FIG. 7 shows a multiwell multisource installation for periodic seismic monitoring of an underground zone, and FIG. 8 diagrammatically shows an example of vibrator comprising an uneven number of transducers.
Figure 6:
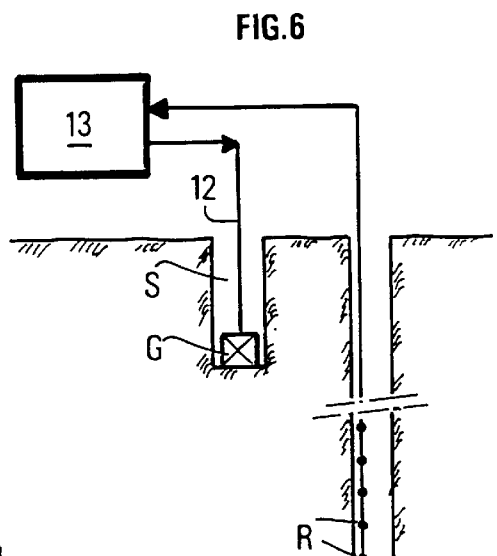

According to the embodiment shown in FIG. 7, several pairs of wells W and cavities S such as those shown in FIG. 6 are drilled at a distance from one another over the whole of the underground zone to be monitored.

The vibrators can be excited successively. The seismic signals received in response to the waves emitted by a vibrator are picked up by receivers R in the various wells and correlated with the seismic waves emitted.

The vibrators can also be actuated simultaneously provided that they are each excited every minute by specific signals obtained by continuous frequency shift or by discontinuous binary code variation as in the aforementioned French patent 2,589,587, so that the point of emission can be identified by correlation with the signals received in the various wells W.

Onshore applications of the vibrator according to the invention have been described. It is however. obvious that it can be coupled with the bottom of a water mass for seismic monitoring of underground zones.

The vibrator can also be used for seismic prospecting operations.

What is claimed is:

1. A piezoelectric vibrator for emitting elastic waves in a material medium, comprising a baseplate coupled in operation with a surface of the material medium, an inertia mass connected to the baseplate by electrically exciting a vibrator electrically connected to an excitation generator, wherein the electrically excited vibrator includes at least two electromechanical transducers, each electromechanical transducer including at least one elongate motive element, each motive element of the first transducer connecting the baseplate to a relay plate and each motive element of the second transducer being connected at a first end to the relay plate and connected at the opposite end thereof to an inertia mass situated between baseplate and the relay plate, the excitation generator being connected to the electromechanical transducers by a phase shifter which applies phase-shifted signals to the electromechanical transducers to cause vibratory signals to be emitted by the electromechanical transducers.

2. The vibrator as claimed in claim 1, wherein the vibrator comprises a pair of transducers placed on a same side of the relay plate and connected thereto, each motive element of the second transducer directly connecting the relay plate to the inertia mass.

3. The vibrator as claimed in claim 1, wherein the vibrator comprises at least two pairs of electromechanical transducers, the electromechanical transducers of each pair being placed on a same side of the relay plate and connected thereto, each motive element of the second electromechanical transducer of the first pair being, at a first end, connected to the relay plate, and, at the opposite end thereof, connected to the inertia mass by means of motive elements of the second pair of the electromechanical transducers and of a pair of relay plates.

4. The vibrator as claimed in claim 1, wherein each transducer comprises motive elements placed in parallel relative to one another and connected in parallel to the phase shifter.

5. The vibrator as claimed in claim 1, wherein at least one recess is provided through the inertia mass which provides free passage of the motive elements of at least one electromechanical transducer.

6. The vibrator as claimed in claim 1, wherein at least one housing is provided in the inertia mass with part of a length of the motive elements of at least another electromechanical transducer being housed in a thickness thereof.

7. The vibrator as claimed in claim 1, comprising means for exciting separately the transducers with amplitude and phase modulable excitation signals to equalize the frequency response of the vibrator.

8. The vibrator as claimed in claim 1, comprising at least three electromechanical transducers connecting the baseplate and the inertia mass, the at least three electromechanical transducers being connected to one another by at least two relay plates, the excitation generator being connected to the electromechanical transducers by the phase shifter which respectively applies phase-shifted excitation signals thereto to cause vibratory signals to be emitted by the electromechanical transducers.

9. The vibrator as claimed in claim 8, wherein the baseplate, inertia mass and each relay plate comprises a recess which passes tubing.

10. The vibrator as claimed in claim 1, wherein the motive elements are one of piezoelectric or magnetostrictive type elements.

11. The vibrator as claimed in claim 2, wherein each transducer comprises motive elements placed in parallel relative to one another and connected in parallel to the phase shifter.

12. The vibrator as claimed in claim 3, wherein each transducer comprises motive elements placed in parallel relative to one another and connected in parallel to the phase shifter.

13. The vibrator as claimed in claim 2, wherein at least one recess is provided through the inertia mass which provides free passage of motive elements of at least one electromechanical transducer.

14. The vibrator as claimed in claim 3, wherein at least one recess is provided through the inertia mass which provides free passage of motive elements of at least one electromechanical transducer.

15. The vibrator as claimed in claim 4, wherein at least one recess is provided through the inertia mass which provides free passage of motive elements of at least one electromechanical transducer.

16. The vibrator as claimed in claim 2, wherein at least one housing is provided in the inertia mass with part of a length of motive elements of at least another transducer being housed in a thickness thereof.

17. The vibrator as claimed in claim 3, wherein at least one housing is provided in the inertia mass with part of a length of motive elements of at least another transducer being housed in a thickness thereof.

18. The vibrator as claimed in claim 4, wherein at least one housing is provided in the inertia mass with part of a length of motive elements of at least another transducer being housed in a thickness thereof.

19. The vibrator as claimed in claim 5, wherein at least one housing is provided in the inertia mass with part of a length of motive elements of at least another transducer being housed in a thickness thereof.

20. The vibrator as claimed in claim 2, comprising means for exciting separately the transducers with amplitude and phase modulable excitation signals to equalize the frequency response of the vibrator.

21. The vibrator as claimed in claim 3, comprising means for exciting separately the transducers with amplitude and phase modulable excitation signals to equalize the frequency response of the vibrator.

22. The vibrator as claimed in claim 4, comprising means for exciting separately the transducers with amplitude and phase modulable excitation signals to equalize the frequency response of the vibrator.

23. The vibrator as claimed in claim 5, comprising means for exciting separately the transducers with amplitude and phase modulable excitation signals to equalize the frequency response of the vibrator.

24. The vibrator as claimed in claim 6, comprising means for exciting separately the transducers with amplitude and phase modulable excitation signals to equalize the frequency response of the vibrator.

25. An application of the vibrator as claimed in claim 1 to seismic prospecting.

26. An application of the vibrator as claimed in claim 2 to seismic prospecting.

27. An application of the vibrator as claimed in claim 3 to seismic prospecting.

28. An application of the vibrator as claimed in claim 4 to seismic prospecting.

29. An application of the vibrator as claimed in claim 5 to seismic prospecting.

30. An application of the vibrator as claimed in claim 6 to seismic prospecting.

31. An application of the vibrator as claimed in claim 7 to seismic prospecting.

32. An application of the vibrator as claimed in claim 8 to seismic prospecting.

33. An application of the vibrator as claimed in claim 9 to seismic prospecting.

34. An application of the vibrator as claimed in claim 10 to seismic prospecting.

35. A method of seismic monitoring of an underground zone, comprising coupling an elastic wave receiver with the zone, including installing, for a monitoring period of the zone, at least one vibrator comprising a baseplate coupled in operation with a surface of the zone, an inertia mass connected to the baseplate by at least two electromechanical transducers placed on a same side of a relay plate and connected thereto, each electromechanical transducer comprising at least one elongate motive element electrically connected to an excitation generator by a phase shifter which respectively applies phase-shifted signals to the at least two electromechanical transducers to cause vibratory signals to be emitted by the at least two electromechanical transducers, installing a network of electric cables connected to the at least two electromechanical transducers of each vibrator, and connecting the electrical cables to a central station comprising the excitation generator and phase shifter to excite each vibrator with amplitude and phase modulable signals, a selective connection of each vibrator by the electric cables to the excitation generator and the phase shifter, and a recorder which records signals coming from the underground zone in response to the elastic waves transmitted in the ground by each vibrator.

36. The method as claimed in claim 35, comprising installing at least one of the at least one vibrator in at least one cavity provided in the ground and coupling the installed at least one vibrator with formations surrounding the cavity to generate longitudinal or transverse waves therein.

37. The method as claimed in claim 35, comprising installing coupling elastic wave receivers in at least one well drilled in the formation.

38. The method as claimed in claim 36, comprising installing coupling elastic wave receivers in at least one well drilled in the formation.

39. The method as claimed in claim 35, comprising distributing in the zone a series of vibrators and receivers coupled with the formation below the surface and carrying out monitoring cycles with excitation of the vibrators and recording of waves reflected by the formation in response to the waves emitted by the vibrators and received by the receivers.

40. The method as claimed in claim 39, wherein the vibrators are actuated successively.

41. The method as claimed in claim 39, wherein the vibrators are excited simultaneously by the application of signals produced by the excitation generator and the phase shifter.

* * * * *